E. PIPON.
PHOTOGRAPHIC APPARATUS FOR TAKING MULTIPLE STEREOSCOPIC VIEWS ACROSS A VERTICALLY UNWINDING FILM.
APPLICATION FILED FEB. 13, 1913.

1,171,639.

Patented Feb. 15, 1916.

2 SHEETS—SHEET 1.

Witnesses:

Inventor:
Emile Pipon
by B. Singer
Atty

E. PIPON.
PHOTOGRAPHIC APPARATUS FOR TAKING MULTIPLE STEREOSCOPIC VIEWS ACROSS A VERTICALLY UNWINDING FILM.
APPLICATION FILED FEB. 13, 1913.
1,171,639.
Patented Feb. 15, 1916.
2 SHEETS—SHEET 2.
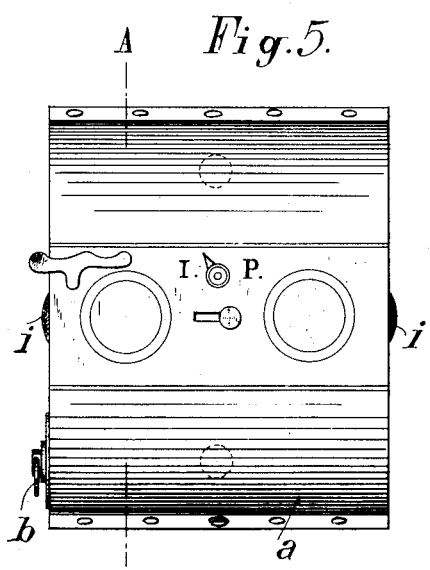
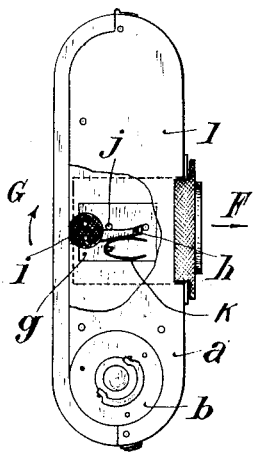
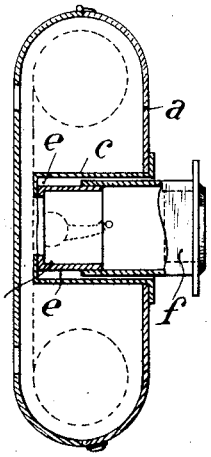

UNITED STATES PATENT OFFICE.

EMILE PIPON, OF PARIS, FRANCE.

PHOTOGRAPHIC APPARATUS FOR TAKING MULTIPLE STEREOSCOPIC VIEWS ACROSS A VERTICALLY-UNWINDING FILM.

1,171,639.

Specification of Letters Patent.

Patented Feb. 15, 1916.

Application filed February 13, 1913. Serial No. 748,134.

*To all whom it may concern:*

Be it known that I, EMILE PIPON, a citizen of the French Republic, and a resident of Paris, France, have invented new and useful Improvements in Photographic Apparatus for Taking Multiple Stereoscopic Views Across a Vertically-Unwinding Film, of which the following is a specification.

The present invention relates to an apparatus whereby multiple stereoscopic views can be taken across vertically unwinding films, the film spool unwinding vertically, for using such films for producing positives the transposition of which is simplified. These positives are to be unwound in a stereoscopic apparatus permitting the exhibition of a succession of silhouettes in front of the objective of the stereoscope.

The invention is illustrated by way of example in the annexed drawings in which—

Figure 1:
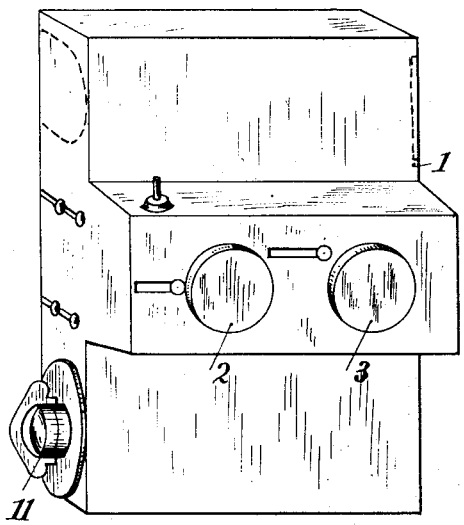
Figure 2:
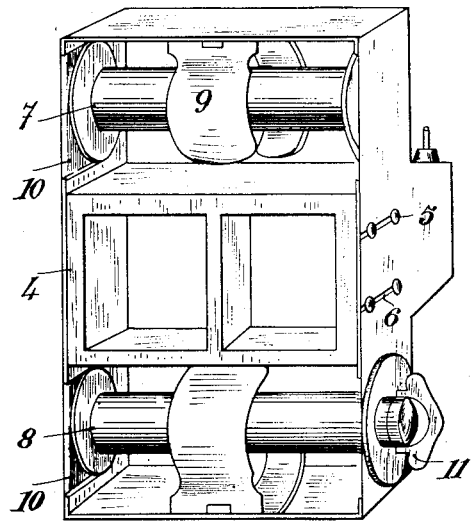
Figure 3:
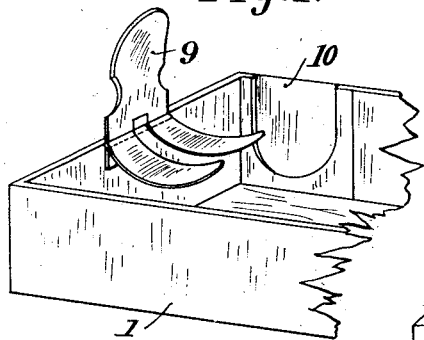
Figure 4:
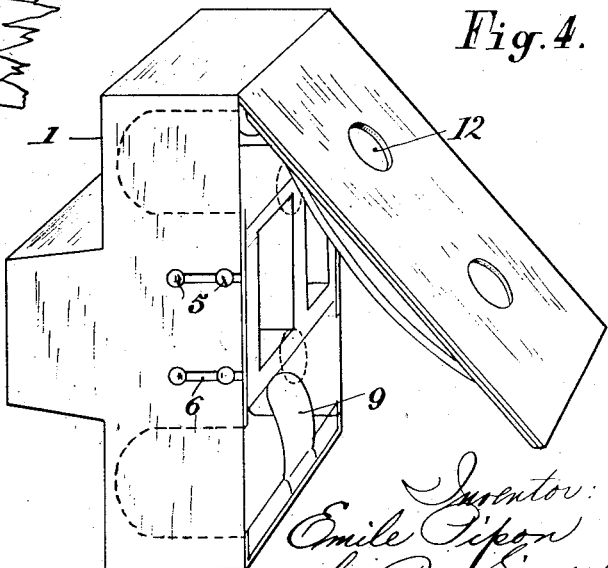

Figure 1 is a perspective front view of the camera. Fig. 2 is a perspective rear view thereof with the back removed. Fig. 3 is a perspective view of the film spool guide. Fig. 4 is a perspective view of a camera showing the registering opening for taking views. Fig. 5 is a front view of the apparatus in its modified form as a pocket camera. Fig. 6 is a side view thereof partly in section, and Fig. 7 is a section on line A—A of Fig. 5.

Referring to Figs. 1 to 4 of the drawings, the apparatus comprises a casing forming a camera 1 of a very reduced size at an intermediate part of which are the two similar lenses 2, 3 conveniently attached thereto. The apparatus also carries on the front all the implements for positively operating the apparatus such as the shutter for time and instantaneous views and a double diaphragm.

Within the main casing or camera and directly behind the lenses 2, 3 or the shutter, is a small partitioned camera 4 intended for giving the exact size to the images. Such chamber or camera is movable to and fro within the apparatus so as to enable the operator to change the lenses if desired. Any suitable means (not shown) may be provided to produce the reciprocating movement of the camera 4 within the apparatus. This operation is carried out by means of screws 5 secured to the side walls of the movable chamber and grooves 6 provided in the sides of the apparatus. In the upper and lower part of the apparatus the film spools or rollers 7, 8 are arranged, from the upper of which the film is unwound vertically for allowing views to be taken crosswise to the film in order to achieve the good results to be more fully explained hereafter.

For charging and discharging the apparatus in day light it will be sufficient to lift up the spring plate 9 and to introduce the film roller 7 in the apparatus, so as to engage the two washers of the film spool in the recess 10 in the sides of the camera. This being first done it will be sufficient to unroll slightly the paper band which will thus be under the spring-plate 9 and to proceed with incasing of the receiving film spool 8 which is controlled by the winding key 11 on the side of the apparatus. This second operation being effected and the film spool being connected with the winding key, the paper band on which the film is secured will then be introduced in the slot of the receiving film spool which will be operated by means of the winding key. In this position the film carrying paper will have numbers exhibited in the circular openings 12 in the cover closing the apparatus. Each number appearing successively in these openings will correspond to two different views taken. Supposing the film contained in the apparatus as having been impressed with various images on its entire length it will be noticed that each image is duplicated by juxtaposition and that the film so impressed will form the negative used for making the positive.

Referring to Figs. 5, 6 and 7, the apparatus consists of a casing $a$ made of any suitable material forming a camera inside which are arranged the spools for carrying the film to be impressed. The film is unwound in the manner described with reference to Figs. 1 to 4, from one of these spools in vertical direction by means of a winding key $b$ in front of the partition camera $c$ within the casing $a$ which is intended for giving the exact size to the images. The partitioned camera is movable inside the above described apparatus and necessitates a certain space on the front of the apparatus thus increasing the volume of the same and rendering it less portable.

As indicated in the Fig. 7 of the drawings, the partitioned camera $c$ is fixed and carries inside a casing *d* secured for instance by means of screws, so as to form a space *e* in which can move the slide *f* carrying the eye-pieces and all the necessary accessories.

When the apparatus is closed as shown in Fig. 6 in order to take pictures, the operator will have to pull the slide in the direction of the arrow F so as to bring the pins *j* to rest at the end of the locking bolts *h*. In this position the slide will not be able to enter itself into the apparatus, in which case the apparatus will have to be held by the left hand in order that the studs *i* might be acted upon in the direction of the arrow, for disengaging the pins, while the slide is operated by the right hand, the slide sliding into the partitioned camera will thus be located in the apparatus and a small part only will project toward the outside, thus enabling the camera to be carried in the pocket.

Having thus described and ascertained the nature of my invention and in what manner it is to be performed what I claim is:

1. A photographic apparatus for taking multiple stereoscopic views on vertically disposed films comprising in combination, a recessed casing constituting a camera having two lenses and shutters, a small camera partitioned off from said casing movable within the same, for registering the images correctly sized by said small camera crosswise on a film, superposed means from which the film is wound and unwound vertically, held within the recess of said casing, means for allowing a charging and discharging of the apparatus in daylight, and means for displaying in succession a plurality of numbers insuring the proper succession of the operations, substantially as described.

2. A photographic apparatus for taking multiple stereoscopic views on vertically disposed films comprising in combination, a recessed casing constituting a camera having two lenses and two shutters, a small camera partitioned off from said casing movable within the same, for registering the images correctly sized by said small camera crosswise on a film, two superposed film spools upon which the film is wound and unwound vertically, held within the recess of said casing, a spring plate coöperating with said recess allowing a charging and discharging of the apparatus in daylight, and a hinged cover provided with openings for the display of numbers insuring the proper succession of the operations, substantially as described.

In witness whereof I have hereunto set my hand in presence of two witnesses.

EMILE PIPON.

Witnesses:
GEORGE RIGOT,
LUCIEN MEMMINGER.